(12) United States Patent
Cheng

(10) Patent No.: US 7,412,271 B2
(45) Date of Patent: Aug. 12, 2008

(54) FOLDING ELECTRONIC DEVICE

(75) Inventor: Tien-Po Cheng, Keelung (TW)

(73) Assignee: Qisda Corporation, Taoyuan (TW)

( * ) Notice: Subject to any disclaimer, the term of this patent is extended or adjusted under 35 U.S.C. 154(b) by 515 days.

(21) Appl. No.: 11/032,204

(22) Filed: Jan. 11, 2005

(65) Prior Publication Data

US 2005/0153753 A1    Jul. 14, 2005

(30) Foreign Application Priority Data

Jan. 13, 2004    (TW) .............................. 93100756 A

(51) Int. Cl.
*H04M 1/00*   (2006.01)
*H04B 1/08*   (2006.01)

(52) U.S. Cl. .................... 455/575.3; 455/348; 455/349; 379/433.13

(58) Field of Classification Search .............. 455/575.3, 455/348, 349, 575.1; 379/428.04, 433.05, 379/433.11, 433.13

See application file for complete search history.

(56) References Cited

U.S. PATENT DOCUMENTS

| | | | | |
|---|---|---|---|---|
| 5,303,291 A | * | 4/1994 | Takagi et al. ............ | 379/433.13 |
| 5,465,401 A | * | 11/1995 | Thompson .................. | 455/558 |
| 5,732,331 A | * | 3/1998 | Harms ...................... | 455/575.3 |
| 6,240,302 B1 | * | 5/2001 | Harrison .................. | 455/556.1 |
| 6,430,400 B1 | * | 8/2002 | MacDonald et al. ....... | 455/90.1 |
| 6,934,568 B2 | * | 8/2005 | Charlier et al. .......... | 455/575.3 |
| 7,212,845 B2 | * | 5/2007 | Ikeuchi .................... | 455/575.3 |

* cited by examiner

*Primary Examiner*—Duc M Nguyen
(74) *Attorney, Agent, or Firm*—Muncy, Geissler, Olds & Lowe, PLLC

(57) ABSTRACT

A folding electronic device including a rotating module, a first body, and a second body. The first body and the second body are connected to the rotating module in a replaceable manner. By means of the rotating module, the second body is coupled to the first body.

19 Claims, 10 Drawing Sheets

13

14

FOLDING ELECTRONIC DEVICE

BACKGROUND

The invention relates to a folding electronic device, and in particular, to a folding mobile phone with an interchangeable body and upper cover portion.

A conventional folding mobile phone comprises a body with keys and a battery. A folding upper cover portion is rotatably disposed on the body via a hinge, and comprises a screen and a receiver. Additionally, the upper cover portion is electrically connected to the body via a flexible printed circuit board.

The disadvantages of the conventional folding mobile phone are described in the following. When any part of the mobile phone malfunctions, the entire disassembly of the mobile phone for repair is possibly required, thus inconveniencing users. Additionally, to change the esthetic shape or the color of the mobile phone housing, the entire disassembly of the mobile might be required.

SUMMARY

In view of this, an embodiment of the invention provides a folding mobile phone with an interchangeable body and an interchangeable upper cover portion.

Accordingly, an embodiment of the invention provides a folding electronic device comprising a rotating module, a first body, and a second body. The first body and the second body are connected to the rotating module in a replaceable manner. By utilizing the rotating module, the second body is coupled to the first body.

In a preferred embodiment, the rotating module comprises a first case, a second case, a first connector, a second connector, and a plurality of metal wires. The first case comprises a first concave portion. The second case is connected to the first case in a rotatable manner, and comprises a second concave portion. The first connector is disposed in the first case and coupled to the first body, and comprises a first plastic member and a plurality of first metal pads disposed on the first plastic member. The second connector is disposed in the second case and coupled to the second body, and comprises a second plastic member and a plurality of second metal pads disposed on the second plastic member. The metal wires are disposed in the first case and the second case to connect the first connector and the second connector.

Furthermore, the rotating module comprises a first magnetic member and a second magnetic member. The first magnetic member is disposed on the first case. The second magnetic member is disposed on the second case. Both the first magnetic member and the second magnetic member are magnets.

Moreover, the first body comprises a third case, a third connector, and a third magnetic member. The third case comprises a first protrusion inserted into the first case. The third connector is coupled to the first connector, and comprises a third plastic member and a plurality of third metal pads disposed on the third plastic member. The third magnetic member is disposed on the third case to assist in connecting the first body and the rotating module.

Additionally, the second body comprises a fourth case, a fourth connector, and a fourth magnetic member. The fourth case comprises a second protrusion inserted into the second case. The fourth connector is coupled to the second connector, and comprises a fourth plastic member and a plurality of fourth metal pads disposed on the fourth plastic member. The fourth magnetic member is disposed on the fourth case to assist in connecting the second body and the rotating module.

In another embodiment, the first connector comprises a plurality of first metal plugs. The second connector comprises a plurality of second metal plugs. The first body comprises a plurality of first metal sockets corresponding to the first metal plugs respectively. The second body comprises a plurality of second metal sockets corresponding to the second metal plugs respectively. The first connector is coupled to the first body by inserting the first metal plugs into the first metal sockets. The second connector is coupled to the second body by inserting the second metal plugs into the second metal sockets.

It is understood that the folding electronic device may be a mobile phone, the first body may be a body of the mobile phone, and the second body may be an upper cover portion of the mobile phone.

BRIEF DESCRIPTION OF THE DRAWINGS

Embodiments of the present invention can be more fully understood by reading the subsequent detailed description and examples with references made to the accompanying drawings, wherein:

FIG. 1b is a schematic view of the assembled mobile phone in FIG. 1a;

FIG. 2a is a schematic view of a rotating module in FIG. 1a;

FIG. 2b is an exploded view of a first connector in FIG. 2a;

FIG. 2d is a schematic view of a second connector in FIG. 2a;

FIG. 3a is a schematic view of a body in FIG. 1a;

FIG. 3b is a schematic view of a third connector in FIG. 3a;

FIG. 4a is a schematic view of an upper cover portion in FIG. 1a;

FIG. 4b is a schematic view of a fourth connector in FIG. 4a;

FIG. 6b is a schematic view of the assembled rotating module in FIG. 6a;

FIG. 6c is another schematic view of the assembled rotating module in FIG. 6a;

DETAILED DESCRIPTION

First Embodiment

Figure 1A:
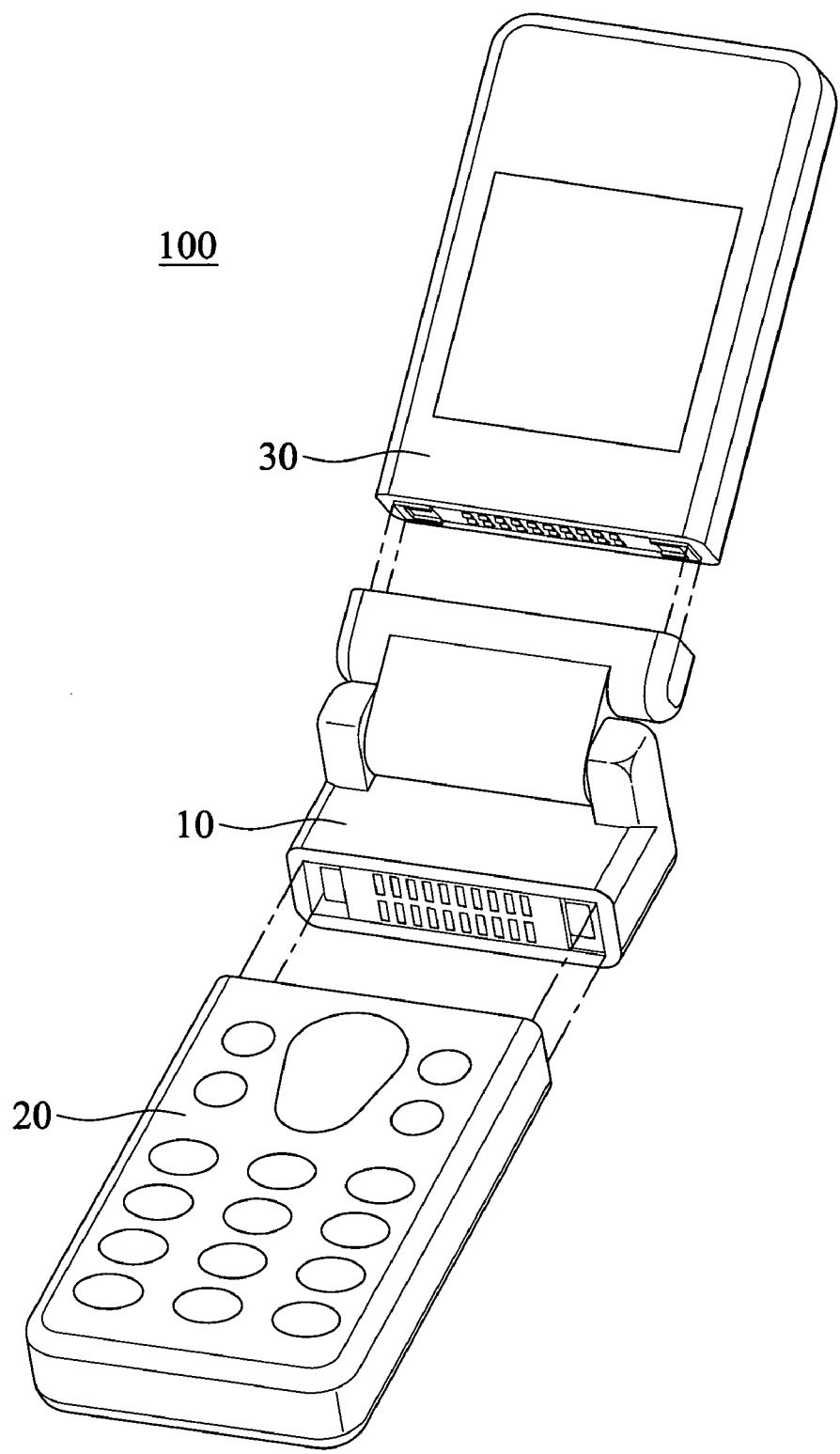
FIG. 1a is a schematic view of a folding mobile phone as disclosed in a first embodiment of the invention.
Figure 1B:
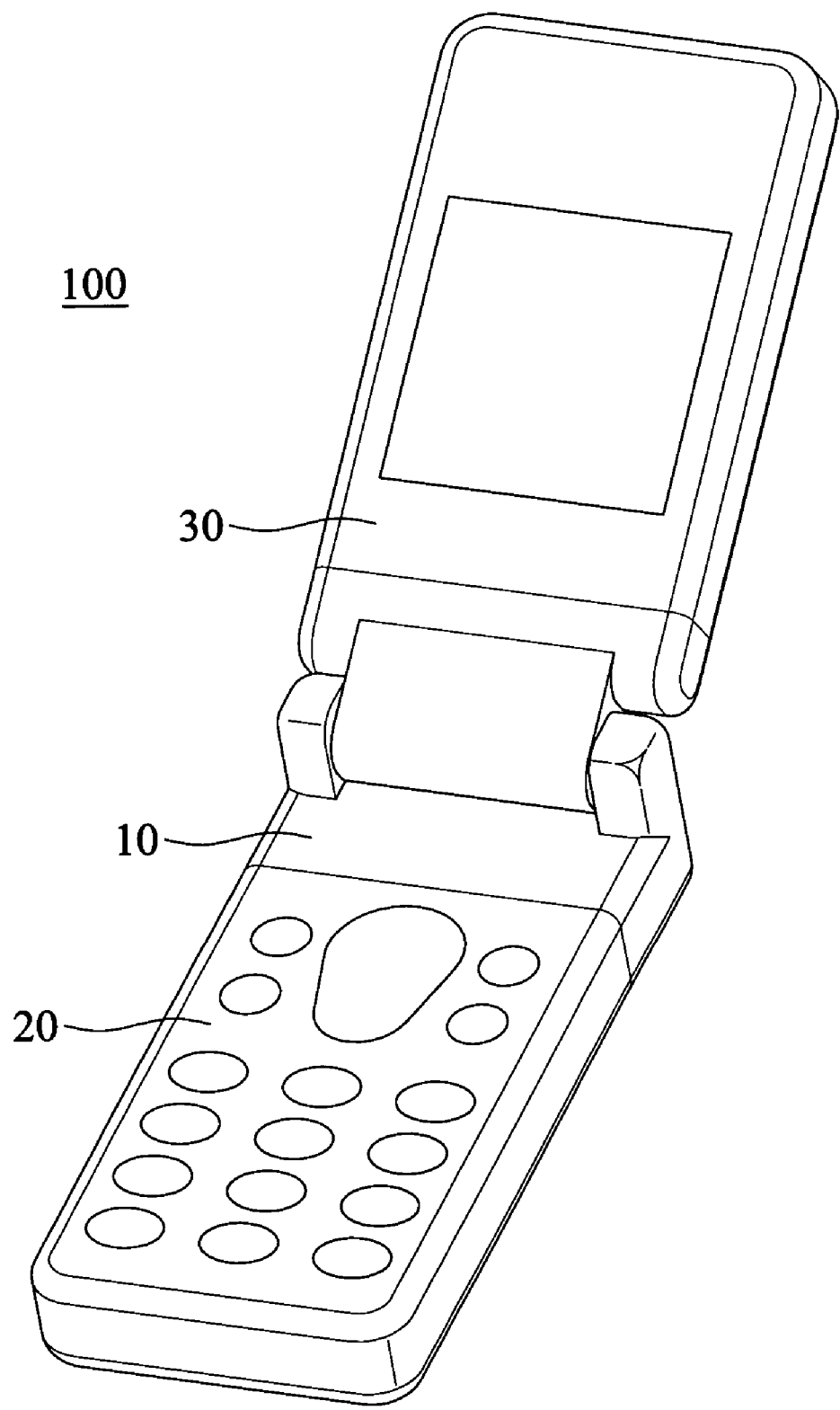

FIGS. 1a and 1b show a folding mobile phone 100 as disclosed in a first embodiment of the invention. As shown in FIG. 1a, the folding mobile phone 100 comprises a rotating module 10, a body 20, and an upper cover portion 30. The body 20 and the upper cover portion 30 are connected to the rotating module 10 in a replaceable manner. By utilizing the connection to the rotating module 10, the upper cover portion 30 is coupled to the body 20.

Figure 2A:
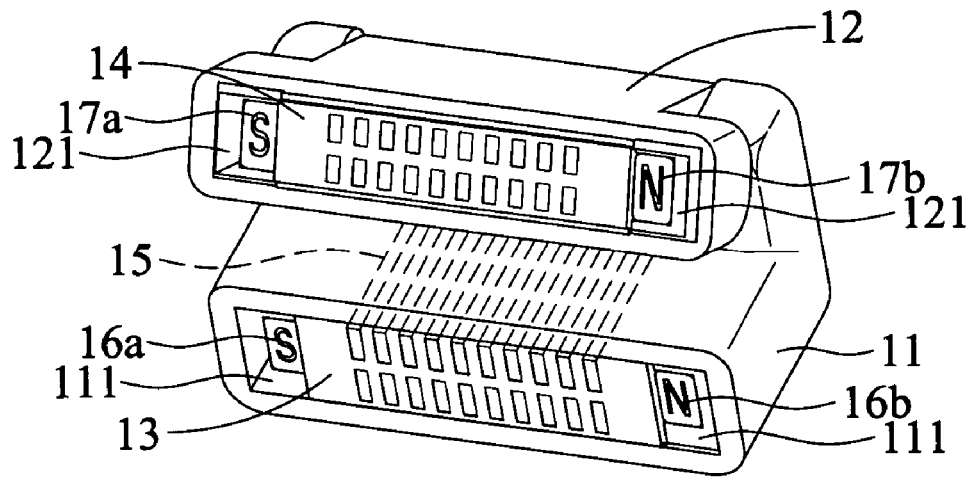

Referring to FIG. 2a, the rotating module 10 comprises a first case 11, a second case 12, a first connector 13, a second connector 14, a plurality of metal wires 15, two first magnetic members 16a, 16b, two second magnetic members 17a, 17b, a rotary shaft (not shown), and a flexible printed circuit board (not shown). The first case 11 serves as a basic component of the rotating module 10, and comprises two first concave portions 111. The second case 12 is connected to the first case 11 in a rotatable manner, and comprises two second concave portions 121.

Figure 2B:
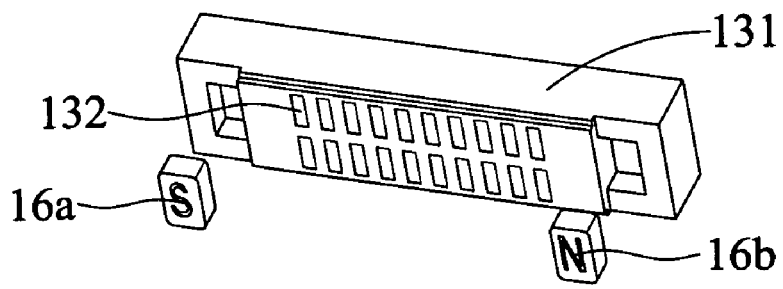
Figure 2C:
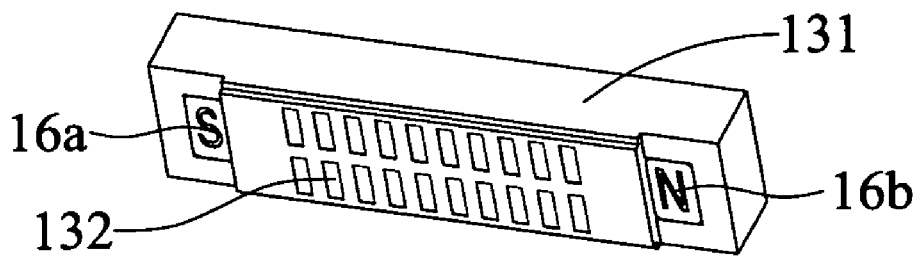
FIG. 2c is a schematic view of the assembled first connector in FIG. 2b.

The first connector 13 is disposed in the first case 11, and is coupled to a third connector 22 of the body 20. As shown in FIGS. 2b and 2c, the first connector 13 comprises a first plastic member 131 and a plurality of first metal pads 132 disposed on the first plastic member 131.

Figure 2D:
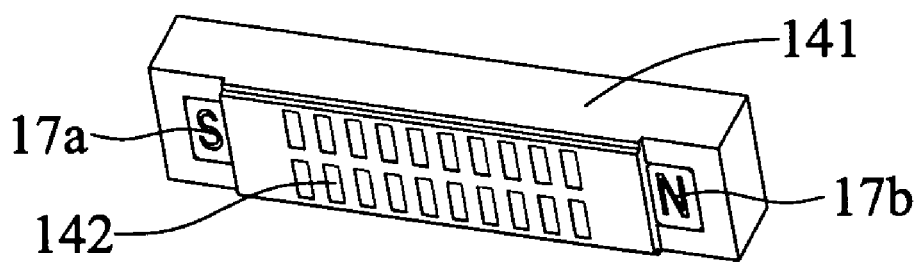

The second connector 14 is disposed in the second case 12, and is coupled to a fourth connector 32 of the upper cover portion 30. As shown in FIG. 2d, the second connector 14 comprises a second plastic member 141 and a plurality of second metal pads 142 disposed on the second plastic member 141.

The metal wires 15 are disposed in the first case 11 and the second case 12 to connect the first connector 13 and the second connector 14. The first magnetic members 16a, 16b are located in the first concave portions 111 of the first case 11 respectively. The second magnetic members 17a, 17b are located in the second concave portions 121 of the second case 12 respectively. The first magnetic members 16a, 16b and the second magnetic members 17a, 17b may be magnets. Magnetism of the first magnetic members 16a, 16b may be the same or different. Magnetisms of the second magnetic members 17a, 17b may also be the same or different.

Figure 3A:
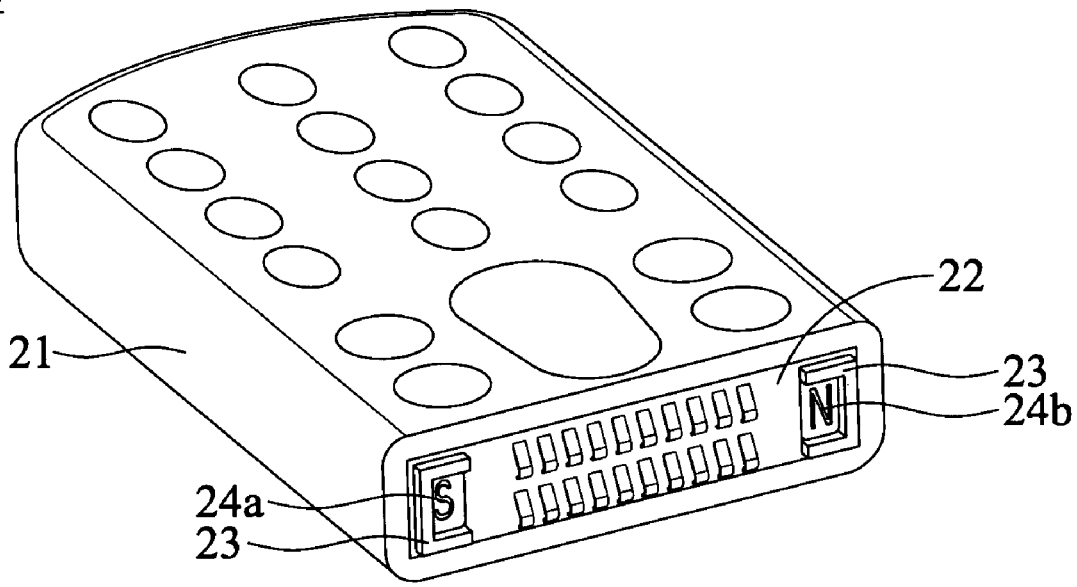
Figure 3B:
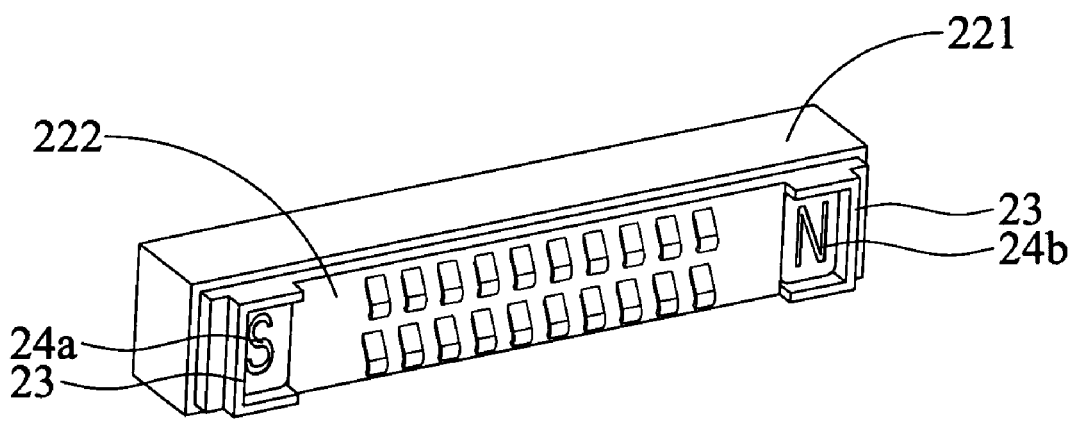

Referring to FIG. 3a, the body 20 comprises a third case 21, a third connector 22, two third magnetic members 24a, 24b, a main board (not shown), a battery (not shown), and keys (not labeled). The third case 21 comprises two first protrusions 23 inserted into the first concave portions 111 of the first case 11 during assembly.

The third connector 22 is coupled to the first connector 13 of the rotating module 10, and comprises a third plastic member 221 and a plurality of third metal pads 222 disposed on the third plastic member 221. It is understood that the third metal pads 222 are coupled to the main board in the body 20 via metal members (not shown).

The third magnetic members 24a, 24b are disposed on the third case 21, and are corresponded to the first magnetic members 16a, 16b of the rotating module 10. Magnetism of the third magnetic members 24a, 24b is different from that of the corresponding first magnetic members 16a, 16b to attract the corresponding first magnetic members 16a, 16b, thus assisting in connection of the body 20 and the rotating module 10.

Figure 4A:
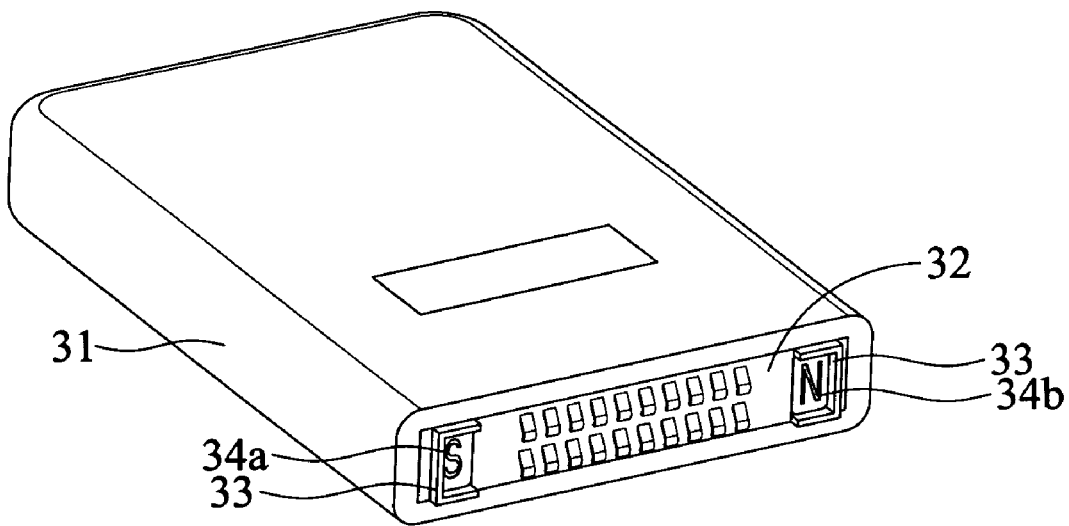

Referring to FIGS. 1b and 4a, the upper cover portion 30 comprises a fourth case 31, a fourth connector 32, two fourth magnetic members 34a, 34b, a screen (not labeled), and a receiver (not shown). The fourth case 31 comprises two second protrusions 33 inserted into the second concave portions 121 of the second case 12 during assembly.

Figure 4B:
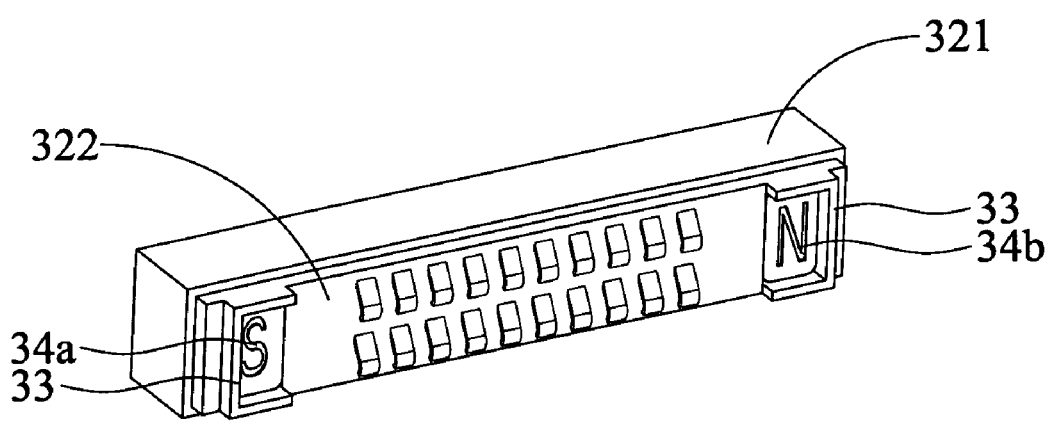

The fourth connector 32 is coupled to the second connector 14 of the rotating module 10, and comprises a fourth plastic member 321 and a plurality of fourth metal pads 322 disposed on the fourth plastic member 321, as shown in FIG. 4b. The fourth magnetic members 34a, 34b are disposed on the fourth case 31, and correspond to the second magnetic members 17a, 17b of the rotating module 10. Magnetism of the fourth magnetic members 34a, 34b is different from that of the corresponding second magnetic members 17a, 17b to attract the corresponding second magnetic members 17a, 17b, thus facilitate connection of the upper cover portion 30 and the rotating module 10.

Figure 5:
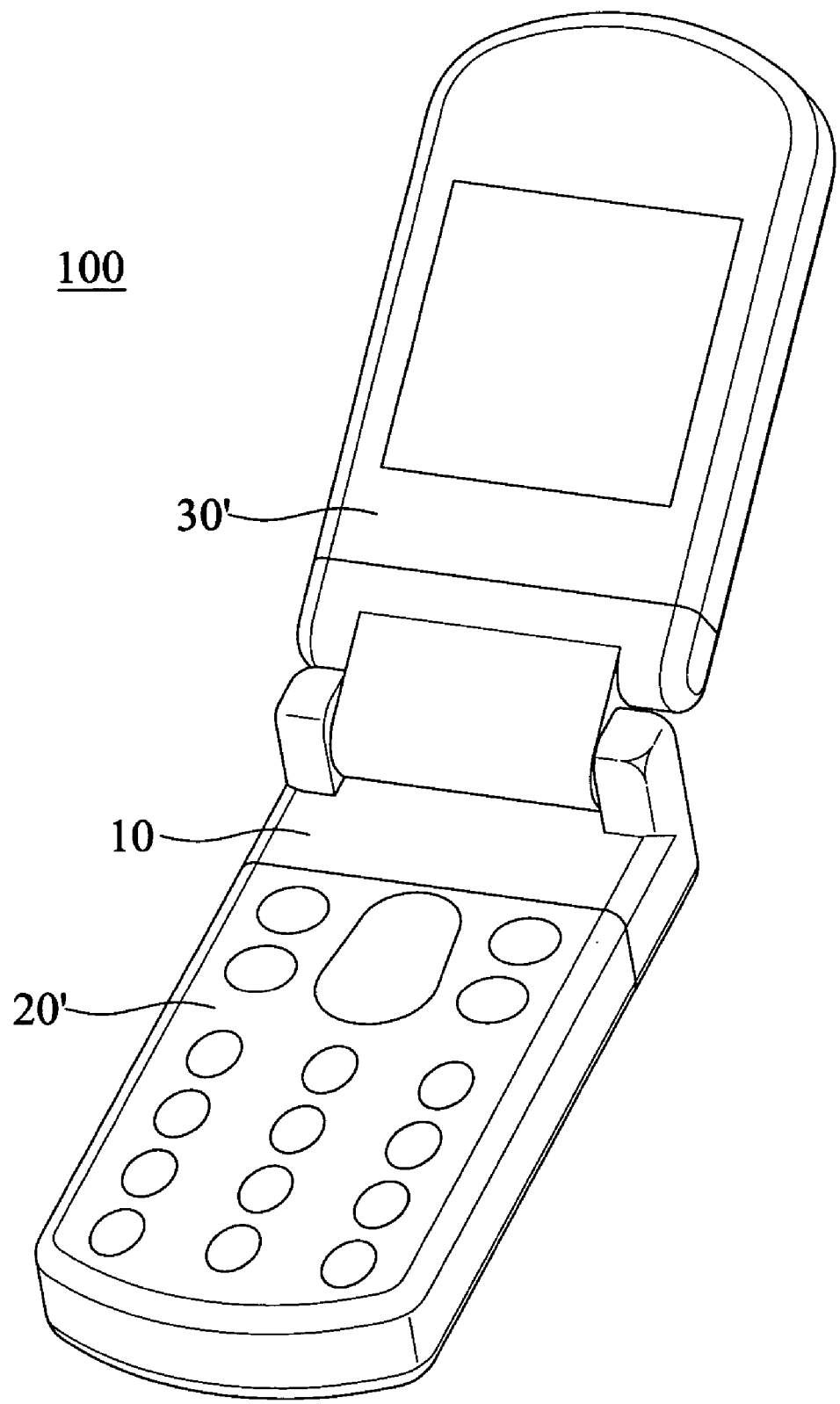
FIG. 5 is another schematic view of the folding mobile phone as disclosed in the first embodiment of the invention.

In the folding mobile phone of an embodiment of the invention, the upper cover portion and the body can be changed individually. As shown in FIG. 5, the mobile phone may replace another housing which is different from that in FIG. 1b. Additionally, the body and the upper cover portion may be tested and serviced individually.

Furthermore, the body and the upper cover portion can be easily combined with the rotating module by the concave portions of the rotating module and the protrusions of the body and the upper cover portion. Additionally, the body and the upper cover portion can be easily aligned with the rotating module by the magnetic members.

Moreover, it is understood that the design concept of the invention is not limited to the folding mobile phone; for example, the concept may be applied to another folding electronic device comprising a rotating module, a first body, and a second body. The first body and the second body are connected to the rotating module in a replaceable manner. By means of the rotating module, the second body is coupled to the first body.

Second Embodiment

FIGS. 6a-7b are schematic views of a folding mobile phone as disclosed in a second embodiment of the invention. The second embodiment differs from the first embodiment in that connectors in this embodiment are different from those in the first embodiment.

Figure 6A:
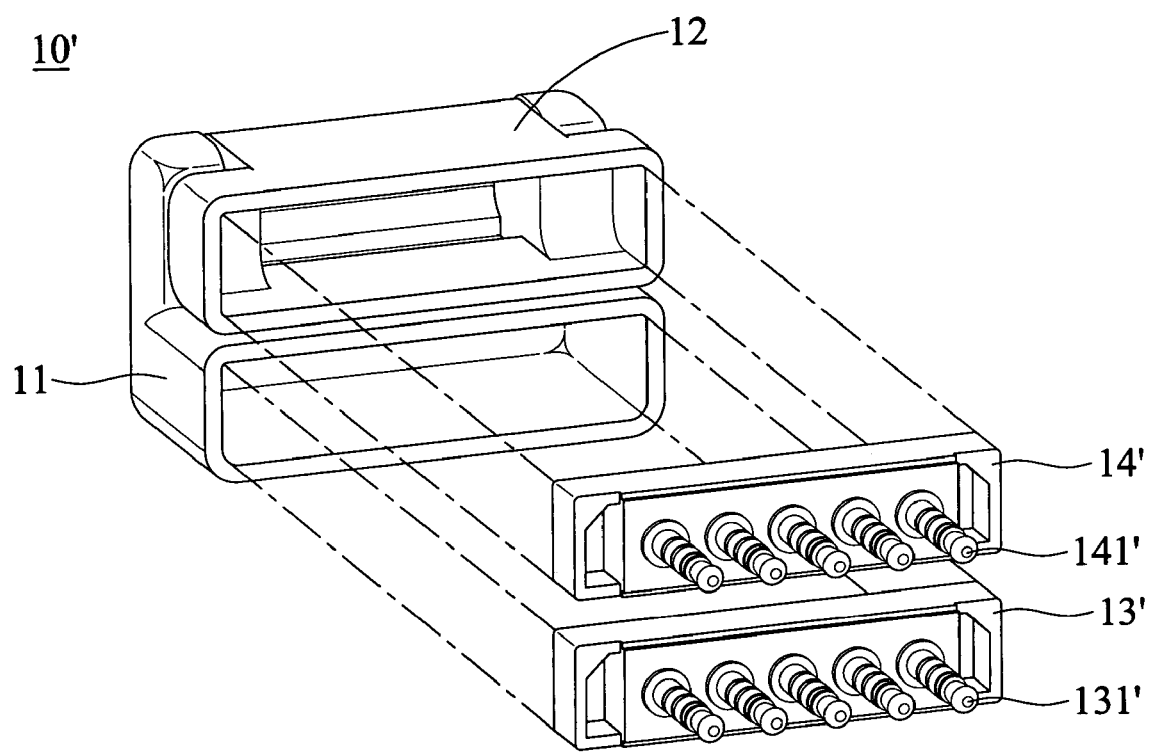
FIG. 6a is a schematic view of a rotating module as disclosed in a second embodiment of the invention.
Figure 6B:
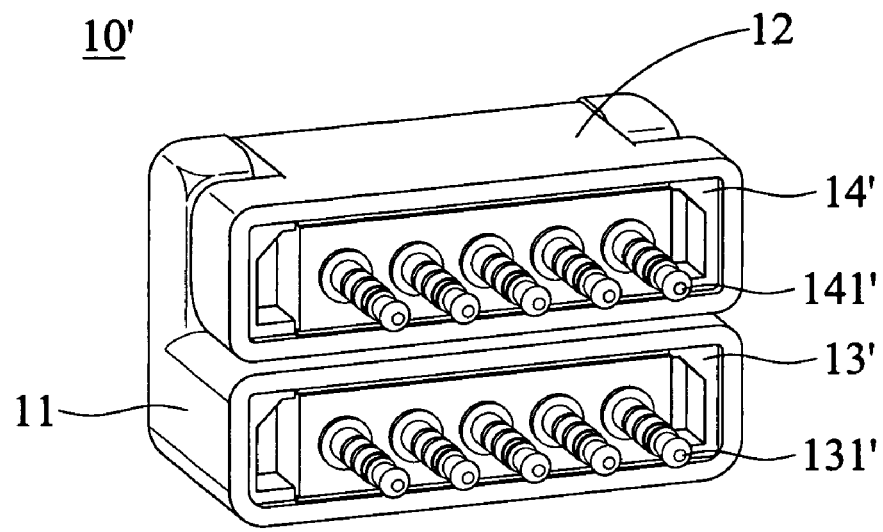
Figure 6C:
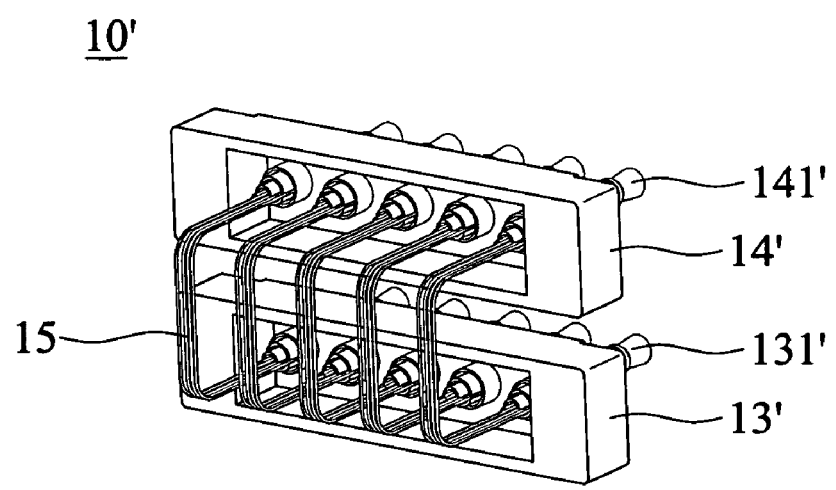
Figure 7A:
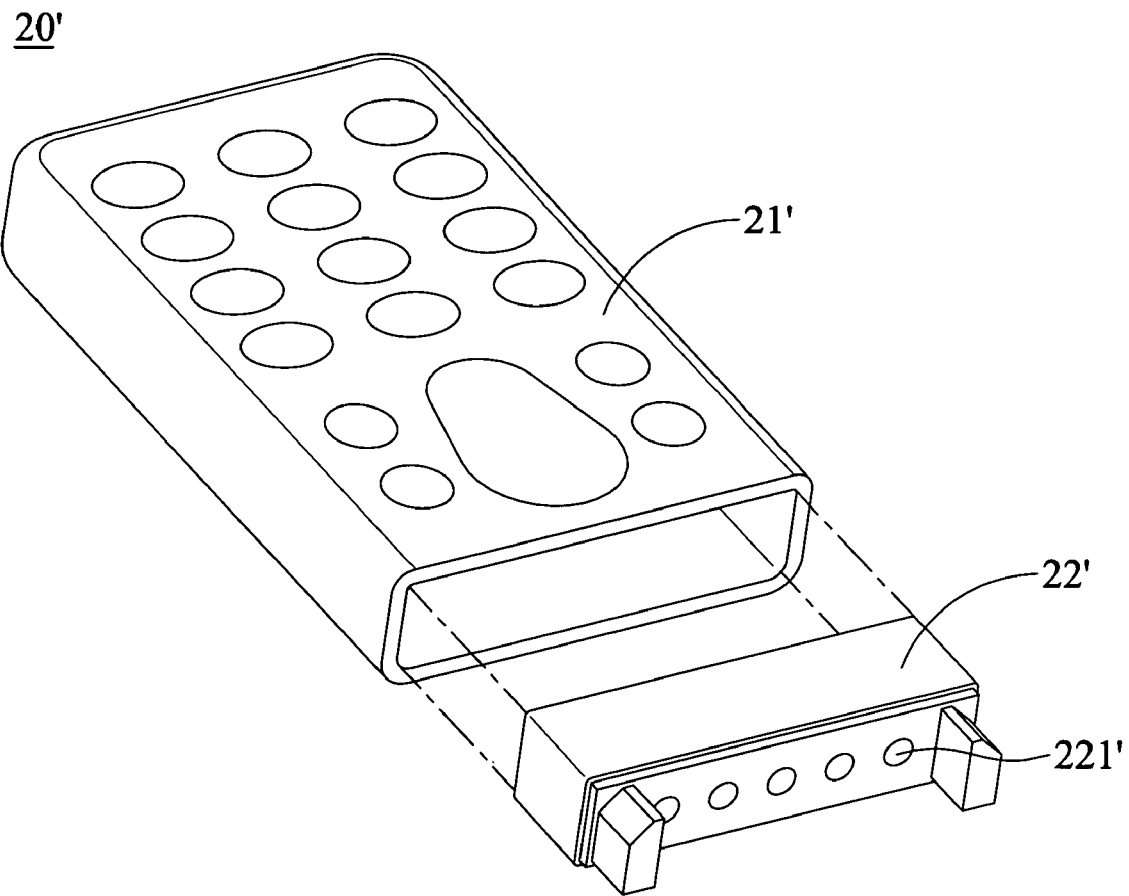
FIG. 7a is a schematic view of a body as disclosed in a second embodiment of the invention.
Figure 7B:
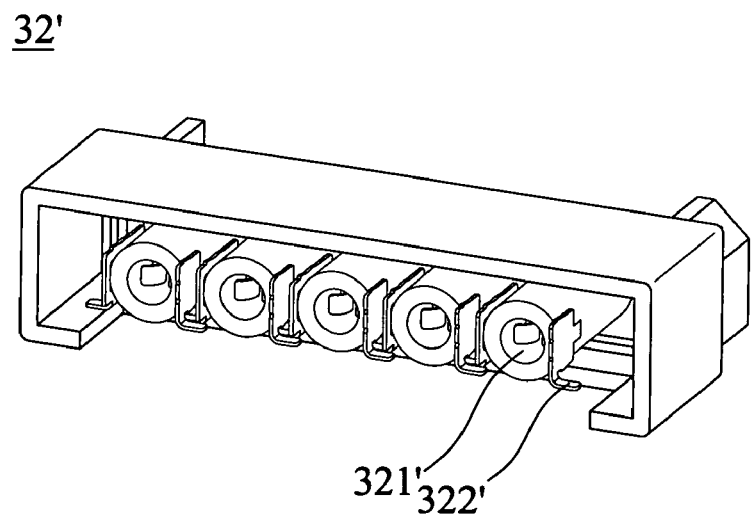
FIG. 7b is a schematic view of a fourth connector as disclosed in a second embodiment of the invention.

Referring to FIGS. 6a-6c, a first connector 13' of a rotating module 10' comprises a plurality of first metal plugs 131'. A second connector 14' of the rotating module 10' comprises a plurality of second metal plugs 141. Additionally, referring to FIG. 7a, a third connector 22' of a body 20 comprises a plurality of first metal sockets 221' corresponding to the first metal plugs 131' respectively. As shown in FIG. 7b, a fourth connector 32' of an upper cover portion 30' comprises a plurality of second metal sockets 321' corresponding to the second metal plugs 141' respectively. The first connector 13' of the rotating module 10' is coupled to the third connector 22' of the body 20' by inserting the first metal plugs 131' into the first metal sockets 221'. The second connector 14' of the rotating module 10' is coupled to the fourth connector 32' of the upper cover portion 30' by inserting the second metal plugs 141' into the second metal sockets 321'. Thus, the upper cover portion 30' is coupled to the body 20 by means of the rotating module 10'.

It is understood that the fourth connector 32' comprises a plurality of metal elastic members 322', as shown in FIG. 7b, to connect to the printed circuit board.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A folding electronic device comprising:
   a rotating module;
   a first body connected to the rotating module in a replaceable manner; and a second body connected to the rotating module in a replaceable manner, wherein the second body is coupled to the first body via the rotating module;

wherein the rotating module comprises:
- a first case;
- a second case connected to the first case in a rotatable manner;
- a first connector disposed in the first case and coupled to the first body; and
- a second connector disposed in the second case and coupled to the second body.

2. The folding electronic device as claimed in claim 1, wherein the rotating module further comprises a plurality of metal wires disposed in the first case and the second case to connect the first connector and the second connector.

3. The folding electronic device as claimed in claim 1, wherein the first connector comprises:
- a first plastic member; and
- a plurality of first metal pads disposed on the first plastic member.

4. The folding electronic device as claimed in claim 1, wherein the second connector comprises:
- a second plastic member; and
- a plurality of second metal pads disposed on the second plastic member.

5. The folding electronic device as claimed in claim 1, wherein the first case comprises a first concave portion, and the second case comprises a second concave portion.

6. The folding electronic device as claimed in claim 1, wherein the rotating module further comprises
- a first magnetic member disposed on the first case; and
- a second magnetic member disposed on the second case.

7. The folding electronic device as claimed in claim 6, wherein both the first magnetic member and the second magnetic member are magnets.

8. The folding electronic device as claimed in claim 1, wherein the first body comprises:
- a third case; and
- a third connector coupled to the first connector.

9. The folding electronic device as claimed in claim 8, wherein the third case comprises a first protrusion inserted into the first case.

10. The folding electronic device as claimed in claim 8, wherein the first body further comprises a third magnetic member disposed on the third case to facilitate connection of the first body and the rotating module.

11. The folding electronic device as claimed in claim 8, wherein the third connector comprises:
- a third plastic member; and
- a plurality of third metal pads disposed on the third plastic member.

12. The folding electronic device as claimed in claim 1, wherein the second body comprises:
- a fourth case; and
- a fourth connector coupled to the second connector.

13. The folding electronic device as claimed in claim 12, wherein the fourth case comprises a second protrusion inserted into the second case.

14. The folding electronic device as claimed in claim 12, wherein the second body further comprises a fourth magnetic member disposed on the fourth case to facilitate connection of the second body and the rotating module.

15. The folding electronic device as claimed in claim 12, wherein the fourth connector comprises:
- a fourth plastic member; and
- a plurality of fourth metal pads disposed on the fourth plastic member.

16. The folding electronic device as claimed in claim 1, wherein the first connector comprises a plurality of first metal plugs, and the second connector comprises a plurality of second metal plugs.

17. The folding electronic device as claimed in claim 16, wherein the first body comprises a plurality of first metal sockets corresponding to the first metal plugs respectively, the second body comprises a plurality of second metal sockets corresponding to the second metal plugs respectively, the first connector is coupled to the first body by inserting the first metal plugs into the first metal sockets, the second connector is coupled to the second body by inserting the second metal plugs into the second metal sockets.

18. The folding electronic device as claimed in claim 1, wherein the folding electronic device is a mobile phone, the first body is a body of the mobile phone, and the second body is an upper cover portion of the mobile phone.

19. The folding electronic device as claimed in claim 1, wherein the rotating module and first body are connected end-to-end in a longitudinal movement.

* * * * *